June 16, 1925.
L. H. GREATHOUSE
PROCESS OF PRODUCING AMMONIUM NITRATE
Filed Sept. 6, 1923
1,541,808
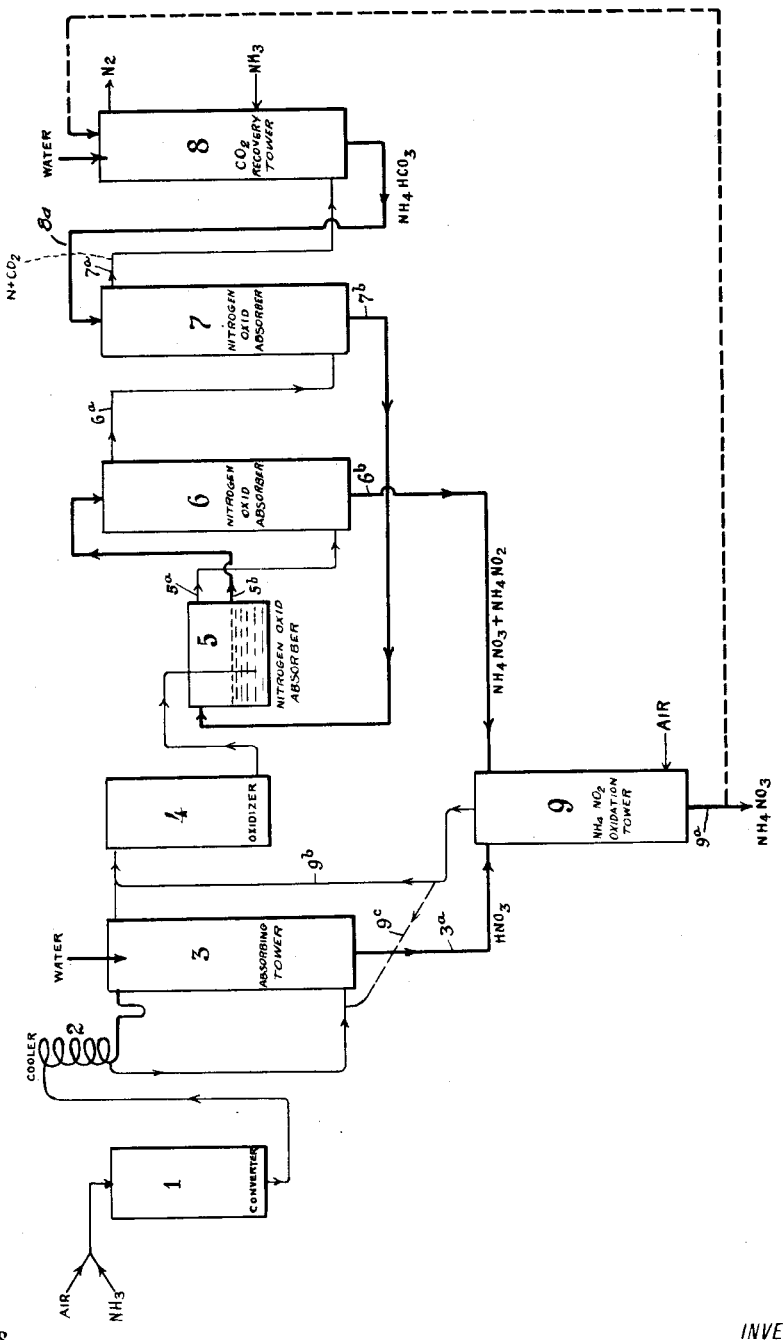
WITNESS
INVENTOR
LUCIEN H. GREATHOUSE
BY
ATTORNEYS Patented June 16, 1925.

1,541,808

UNITED STATES PATENT OFFICE.

LUCIEN H. GREATHOUSE, OF CLARENDON, VIRGINIA, ASSIGNOR TO ATMOSPHERIC NITROGEN CORPORATION, OF SYRACUSE, NEW YORK, A CORPORATION OF NEW YORK.

PROCESS OF PRODUCING AMMONIUM NITRATE.

Application filed September 6, 1923. Serial No. 661,150.

*To all whom it may concern:*

Be it known that I, LUCIEN H. GREATHOUSE, a citizen of the United States, and resident of Clarendon, county of Arlington, State of Virginia, have invented certain new and useful Processes of Producing Ammonium Nitrate, of which the following is a specification.

This invention relates to the economical utilization of a nitrogen oxide gas mixture, particularly such as that which results from the catalytic oxidation of ammonia with air, and the special end result of the invention is the production of ammonium nitrate from such a gas mixture.

Heretofore processes employed for the manufacture of ammonium nitrate from nitrogen oxides have been what may be called indirect processes, that is, processes involving either the production of commercial nitric acid as a regular factory product and the subsequent neutralization of nitric acid so produced with ammonia or the production of some metallic salt of nitric acid (such as sodium or calcium nitrates) followed by a double decomposition between the salt and a suitable ammonium salt such as the sulfate or carbonate. Practically, therefore, the production of ammonium nitrate has heretofore always involved as an intermediate product another or second nitrate (or nitric acid).

I have found that such indirect methods may be avoided by causing the nitrogen oxides to be absorbed directly by a suitable ammonia compound, such as ammonium bicarbonate, in liquid solution, thus forming a mixed solution of ammonium nitrate and ammonium nitrite and then converting the nitrite also into ammonium nitrate by treatment with nitric acid and preferably with nitric acid formed by an initial conversion of a fraction of the nitrogen oxides delivered from the original sources of nitrogen oxides. The residue of nitrogen oxides, existing in greater dilution are collected as ammonium nitrate as herein described. The process of this invention, consequently, is capable of being exercised as a direct process in a self-contained system.

In the accompanying drawing, which is a diagrammatic flow sheet illustrative of the manner in which the invention may be carried out, heavy lines are used to indicate the passages provided for the travel of liquids while lighter lines indicate the passages provided for the travel of gases. In this drawing air or other suitable mixture containing oxygen and gaseous (preferably synthetic and therefore pure and anhydrous) ammonia are introduced into a converter 1 wherein, in well known manner, these gases pass a catalyst and there is formed an 8–12% nitrogen oxide containing gas. This nitrogen oxide gas from the converter 1, after passing through a suitable cooling and condensive apparatus 2, is allowed to react and be absorbed in part in absorbing towers 3, into which additional water, other than that condensed from the gases may or may not be introduced. These towers 3 are of known construction, and the part of the nitrogen oxides absorbed therein forms nitric acid, which is thereupon led through the passage 3ª into the final tower 9 for the purposes and with the results to be hereinafter described. The residual unabsorbed gases leaving the tower 3, after first preferably passing through a preliminary oxidizing chamber 4, are treated with ammonium bicarbonate solution in one or more absorbing vessels. In the drawing, three such absorbing vessels numbered 5, 6 and 7 are illustrated. In these absorbing vessels practically complete absorption of the nitrogen oxide gas takes place, the product being an ammonium nitrate-ammonium nitrite solution containing .2–.3% free ammonia as unconverted bicarbonate. In this reaction carbon dioxide is formed and passes from the solution into the gas stream being ultimately reabsorbed in tower 8.

It will be observed that the residual unabsorbed gases from the absorber 5 flow through conduit 5ª into absorber 6 and that the residual nitrogen oxide gases from the absorber 6 flow through the conduit 6ª into the absorber 7, after which there are practically no more nitrogen oxides in the gas which leaves the absorber at 7ª, said gas at this point consisting practically of nitrogen and carbon dioxide which flow from the absorber 7 through the conduit 7ª into the ammonium bicarbonate tower 8. In this last named tower the carbon dioxide is reabsorbed as ammonium carbonate, ammonium bicarbonate, a mixture of the two, or as the bicarbonate together with dissolved carbon dioxide as the result of regulated introduction into said tower of ammonia and water as indicated on the drawing. The carbonate thus produced in the tower 8 passes through the conduit 8ª into the absorber 7 and there becomes partially converted by the nitrogen oxides into ammonium nitrate and ammonium nitrite solution, said solution being thereupon through the conduit 7ᵇ withdrawn into the absorber 5, in which additional absorption of nitrogen oxides takes place. The liquid from absorber 5 then passes through conduit 5ᵇ into the said absorber 6 and the liquid from said absorber 6, a mixture of ammonium nitrate and ammonium nitrite with a small fraction of bicarbonate is passed through conduit 6ᵇ into the final tower 9. In this tower the nitrate-nitrite solution is allowed to flow down, together with the nitric acid, from the absorbing towers 3, already described, while a countercurrent of air, introduced at the bottom of the tower 9, passes in the reverse direction. If such air is replaced by an inert gas (N) or other mechanical agitator, the quantity of nitric acid admitted to the tower 9 will have to be somewhat increased. The result of these treatments is that the ammonium nitrite content of the solution is converted to ammonium nitrate (and the fraction of bicarbonate is converted into nitrate) so that the exit liquor which leaves the system at 9ª is a solution of ammonium nitrate. The gaseous products developed in tower 9, containing nitrogen oxides are introduced to the system at the oxidizer 4 for eventual conversion into ammonium nitrate, as previously described. Said nitrogen oxides may, however, also be returned to the system through the passage 9ᶜ shown in dotted lines or at any other suitable point.

It was found that ammonia in the form of aqua ammonia cannot be profitably used for the absorption of these nitrogen oxides and it remained for me to discover that a highly satisfactory result is obtained provided the ammonia is used in conjunction with carbonic acid, e. g. in the form of a carbonate of ammonia and especially as above described. This result is still further favored by cooling the carbonate or bicarbonate solution as the case may be, preferably to about zero degrees C. and by saturating it with carbon dioxide gas. On the other hand, care should be taken to prevent the absorbing liquid from ever becoming acid with nitric acid even locally and to this end a bicarbonate content corresponding to .2–.3% free ammonia is maintained in the exit solution from 6.

Decreased time of contact (increased rate of absorption) also decreases the decomposition and the first absorbing vessel 5 is, consequently, illustrated in the form of a bubbling tank instead of a tower. It is not necessary that more than one absorbing vessel be employed although for complete absorption more than one absorbing vessel will probably be necessary in most cases. In that special form of system illustrated in the drawing in which a three vessel absorbing system is used, it is preferred to proceed by introducing the fresh solution into the final absorbing tower 7, then bringing it to the first absorbing tank 5 and finally to the middle absorbing vessel 6.

Oxidizing chambers similar to that numbered 4 may be interposed also between the absorbing vessels 5, 6 and 7.

For the final conversion of ammonium nitrate in the tower 9, fairly concentrated nitric acid is better suited than nitric oxide or a mixture of nitrogen oxides. An acid of 48% gives good results and can be easily made directly within the system described as an incident in the general process. With such acid, leaving out of account the amount of nitric acid required to neutralize the small fraction of unconverted bicarbonate which is intentionally maintained in the solution that enters the final tower 9, it will require a little less than the theoretical two molecular proportions of said acid to three of nitrite to accomplish the results aimed at in the tower 9. The solution withdrawn from the tower 9 and which is now an ammonium nitrate solution, made by crystallization or evaporation or other appropriate method, be brought to solid form as commercial ammonium nitrate fit for use in the manufacture of fertilizers, explosives, etc.

It is, of course, understood that the invention is not limited either to the exact proportions or temperatures or other details that have been specified in the foregoing description since these may be readily varied without departing from the invention. The preferred embodiment of the invention is, however, that which is herein described, to wit, a closed system in which the only raw materials are ammonia, air and water and in which a part of the nitrogen oxides in the form of nitric acid and before their conversion into nitrate are permitted to function as oxygen carriers for the conversion of ammonium nitrite to nitrate. Preferably, therefore, the amount of nitric acid which is allowed to be formed should correspond to that which is necessary for said oxidation of the nitrite to nitrate (and for the neutralization of the small amount of free ammonium bicarbonate in the nitrite solution) which in turn will depend on the ratio between nitrate and nitrite in the final absorption product. That ratio will be ascertained by analysis and said ratio can be regulated by a number of conditions such as the oxygen content of the gas, the number and size of oxidizing chambers, etc.

Numerous other variations of the invention are possible. For example, instead of considering ammonium nitrate at 9ª of the drawing as the final product, the ammonium nitrate may be returned to the system and introduced to the tower 8 in place of water, in which event the nitrate solution will serve as a vehicle for the ammonium carbonate. The concentration of the ammonium nitrate product from the tower 9 would in that case increase and when said concentration had reached the desired or maximum strength, a part of the concentrated circulating nitrate may be removed as the final product and part returned to the system to maintain the product at this given strength, whereby the ultimate process of solidification of the nitrate will be correspondingly relieved.

The over-all efficiency of the process is subject to be affected mainly by losses in the absorption stage (apparatus 5, 6 and 7). The major portion of the loss of efficiency at this point is due probably to decomposition during the absorption of the last thirty per cent of the nitrogen oxides in towers 6 and 7 wherein the oxides being dilute, a relatively long time of contact is necessary for absorption. It is, consequently, for some purposes, advisable to make some other use of these dilute oxides, in which case the absorption system may be simplified as, for instance, by dispensing with towers 6 and 7 and employing the tank 5 alone for absorption of the less dilute nitrogen oxides in ammonium bicarbonate.

The invention as described with respect to reliance upon ammonium bicarbonate as the absorbing medium may also be practiced by using other equivalent carbonate, bicarbonate or other solutions although ammonium bicarbonate solution is to be preferred. For the purposes of the claims, the expression ammonium carbonate is used to designate a solution such as may be obtained by passing $CO_2$ and $NH_3$ (irrespective of their relative proportions or volume) into water.

I claim:

1. The process which consists in bringing a nitrogen oxide into absorbing contact with ammonium carbonate.

2. The process which consists in bringing nitrogen oxides into absorbing contact with ammonium carbonate and maintaining said contact until the major part of said oxides are absorbed and a mixture of ammonium nitrate and ammonium nitrite is produced.

3. The process of producing ammonium nitrate which consists in first preparing from nitrogen oxides and ammonium carbonate, and then treating with nitric acid, a mixture of ammonium nitrate and ammonium nitrite.

4. The process of producing ammonium nitrate which consists in bringing nitrogen oxides into absorbing contact with ammonium carbonate to produce a mixture of ammonium nitrate and ammonium nitrite, then oxidizing the nitrite content of the solution.

5. The process of producing ammonium nitrate which consists in bringing nitrogen oxides into absorbing contact with ammonium carbonate to produce a mixture of ammonium nitrate and ammonium nitrite, then oxidizing the nitrite content of the solution produced by nitric acid and removing dissolved nitrogen oxides from the solution, and then introducing the resultant nitrogen oxides from said treatments into the flow of the nitrogen oxides first mentioned.

6. The process of producing ammonium nitrate which consists in preparing a gas containing nitrogen oxides, absorbing a portion of said oxides in water to produce nitric acid, bringing the remaining nitrogen oxides into absorbing contact with ammonium carbonate to produce a mixture of ammonium nitrate and ammonium nitrite, then oxidizing the nitrite content of the solution produced by the nitric acid first produced and passing air through the solution.

7. The process of producing ammonium nitrate which consists in preparing a gas containing nitrogen oxides, absorbing a portion of said oxides in water to produce nitric acid, bringing the remaining nitrogen oxides into absorbing contact with ammonium carbonate to produce a mixture of ammonium nitrate and ammonium nitrite, then oxidizing the nitrite content of the solution produced by the nitric acid first produced, and then reintroducing the resultant nitrogen oxides into the flow of the nitrogen oxides first mentioned.

8. The process of producing ammonium nitrate which consists in establishing a supply of ammonium carbonate, bringing the same into absorbing contact with nitrogen oxides in the form of gas thereby producing ammonium nitrate and ammonium nitrite and releasing carbon dioxide as a gas, reabsorbing the carbon dioxide in a solution containing water and ammonia to replenish the supply of ammonium carbonate and treating the mixture of nitrate and nitrite with nitric acid to convert the nitrite to nitrate.

9. The process of producing ammonium nitrate which consists in establishing a supply of ammonium carbonate, bringing the same into absorbing contact with nitrogen oxides in the form of gas thereby producing ammonium nitrate and ammonium nitrite and releasing carbon dioxide as a gas, reabsorbing the carbon dioxide in a solution containing water and ammonia to replenish the supply of ammonium carbonate and treating the mixture of nitrate and nitrite with nitric acid to convert the nitrite to nitrate and then introducing the resultant nitrogen oxides into the flow of the nitrogen oxides first mentioned.

10. The process of producing ammonium nitrate which consists in bringing nitrogen oxides into absorbing contact with ammonium carbonate to produce a mixture of ammonium nitrate and ammonium nitrite while maintaining in said solution at all times a percentage of carbonate, then oxidizing the nitrite content of the solution produced by nitric acid.

11. The process of producing ammonium nitrate which consists in preparing a gas containing nitrogen oxides, absorbing a portion of said oxides in water to produce nitric acid, bringing the remaining nitrogen oxides into absorbing contact with ammonium carbonate to produce a mixture of ammonium nitrate and ammonium nitrite until no material quantity of nitrogen oxides remain in the gas, then oxidizing the nitrite content of the solution produced by the nitric acid first produced and passing air through the solution.

12. The process of producing ammonium nitrate which consists in preparing a gas containing nitrogen oxides, absorbing a portion of said oxides in water to produce nitric acid, bringing the remaining nitrogen oxides into absorbing contact with ammonium carbonate to produce a mixture of ammonium nitrate and ammonium nitrite until no material quantity of nitrogen oxides remain in the gas, then oxidizing the nitrite content of the solution produced by the nitric acid first produced and passing air through the solution and then reintroducing the resultant nitrogen oxides into the flow of the nitrogen oxides first mentioned.

In testimony whereof I have hereunto set my hand.

LUCIEN H. GREATHOUSE.